United States Patent
Fiset et al.

(10) Patent No.: US 7,534,285 B2
(45) Date of Patent: May 19, 2009

(54) METHOD AND APPARATUS FOR THE RECOVERY OF REFRACTORY MINERAL ORES

(76) Inventors: Gilles Fiset, 614, Place Cinquentenaire, Rouyn-Noranda, Quebec (CA) J9X 5Y9; Edmond St-Jean, 614, Place Cinquentenaire, Rouyn-Noranda, Quebec (CA) J9X 5Y9

( * ) Notice: Subject to any disclaimer, the term of this patent is extended or adjusted under 35 U.S.C. 154(b) by 209 days.

(21) Appl. No.: 11/795,965

(22) PCT Filed: Aug. 17, 2006

(86) PCT No.: PCT/CA2006/001368
§ 371 (c)(1),
(2), (4) Date: Jul. 24, 2007

(87) PCT Pub. No.: WO2007/019707
PCT Pub. Date: Feb. 22, 2007

(65) Prior Publication Data
US 2008/0184849 A1 Aug. 7, 2008

(30) Foreign Application Priority Data
Aug. 18, 2005 (GB) .................. 0516912.3

(51) Int. Cl.
*C22B 3/14* (2006.01)
*C22B 3/22* (2006.01)
*C02F 1/62* (2006.01)
*C02F 9/00* (2006.01)
*B01D 37/02* (2006.01)

(52) U.S. Cl. ............... 75/736; 75/724; 75/732; 75/737; 75/738; 423/22; 423/27; 423/42; 423/140

(58) Field of Classification Search ............. 423/23, 423/26–29, 34, 42; 75/724, 732, 736, 737; *C22B 03/14; C02F 1/62, 9/00; B01D 37/02*
See application file for complete search history.

(56) References Cited

U.S. PATENT DOCUMENTS

| | | | | |
|---|---|---|---|---|
| 4,342,592 A * | 8/1982 | Lamb | ............ | 75/733 |
| 4,654,078 A * | 3/1987 | Perez et al. | ............ | 75/733 |
| 6,833,021 B1 * | 12/2004 | Hourn et al. | ............ | 75/744 |
| 6,835,230 B2 * | 12/2004 | Kanno et al. | ............ | 75/743 |
| 2006/0191377 A1 * | 8/2006 | Marsden et al. | ............ | 75/731 |
| 2006/0219640 A1 * | 10/2006 | Lehtinen et al. | ............ | 210/722 |

* cited by examiner

*Primary Examiner*—Jerry Lorengo
*Assistant Examiner*—Jared Wood

(57) ABSTRACT

A method for extraction a metal from a mineral ore including a refractory ore contained in a metal. The method includes concentration of refractory ore followed by micronization of the concentrate until gold is liberated by the extraction solution and mixing of micronized concentrate with concentration rejects or by-products to facilitate recovery of the treatment solution.

14 Claims, 4 Drawing Sheets

METHOD AND APPARATUS FOR THE RECOVERY OF REFRACTORY MINERAL ORES

FIELD OF THE INVENTION

The present invention relates to the general field of mineral recovering methods and devices and is particularly concerned with a method and apparatus for recovering refractory mineral ores.

BACKGROUND OF THE INVENTION

Various metals, including gold and other precious metals, naturally occur in ores in several different forms and complexes. Some metals are recovered from their mined ores by the use of aqueous solutions to leach or dissolve the desired metal from such ore. The aqueous solution used for a given metal contains some chemical agent that converts the metal to a soluble form. For instance, gold may be recovered from a gold-containing ore by leaching such ores with an aqueous solution of cyanide, typically but not necessarily sodium cyanide to form gold cyanide. Such a species is soluble in water or at least in the aqueous leaching solution at a concentration sufficient for pregnant liquors.

During direct cyanidation, gold-bearing ore is hence crushed, ground and added to a lime and sodium cyanide solution before it thickens. The mixture is left in agitators for a period of 24 to 48 hours. Once gold has dissolved, it is recovered using activated carbon, resin or precipitated powdered zinc.

World wide, there exists many ores that are considered refractory to conventional extraction processes. For example, in refractory gold ores, the gold is typically finely disseminated in a pyretic mineral and cannot be treated by conventional methods. Indeed, gold may be physically entrapped in a matrix of sulphide metals, such as iron pyrite and arsenopyrite. The matrix is not penetrated by cyanide solutions and, thus, a cyanide solution alone cannot extract and dissolve the gold from such ore.

If the conventional direct cyanidation method is applied to arsenopyrite ore, or other mineral assemblages refractory to cyaniding, only 40 to 60 percent of the gold eventually dissolves.

Accordingly, the prior art has shown examples of methods used for extracting so-called refractory ores. One such method involves first reducing the refractory ore to a concentrate. The latter is then roasted prior to being cyanidated to liberate gold by evaporation of sulphides and arsenic. However, this method presents serious environmental drawbacks and, as such, is even prohibited in some countries such as Canada, for example.

Other methods involve concentrating the refractory mineral ore and processing the concentrate using various methods. For example, the concentrate may be sent to a copper refinery where gold is recovered and sulphides are used as combustible matter. However, the ore must have a very low arsenic content, otherwise refineries will refuse to process the concentrate. Alternatively, the concentrate may be leached by autoclaving in ore to dissolve all of the sulphide and arsenic particles prior to cyaniding gold. This method is, however, very expensive to install and operate. Furthermore, it generates by-products that are potentially very harmful to the environment. In, yet, another alternative method, concentrates undergo bacterial lixiviation in order to render sulphide crystals porous by dissolving part of the sulphide and arsenic before cyaniding gold. This method is also slow and expensive to operate and relatively unstable since bacteria can be compromised by slight temperature variations. Furthermore, it produces by-products that, again, may prove to be highly detrimental to the environment.

Accordingly, there exists a need for an improved method and device for extracting refractory mineral ores such as refractory precious metal ores including refractory gold-bearing ore. It is a general object of the present invention to provide such an improved extraction method and device.

SUMMARY OF THE INVENTION

In a first broad aspect, the invention provides a method for extracting a metal from a mineral ore including a refractory ore contained in a gangue. The method includes:
   crushing, including grinding, the mineral ore to liberate the refractory ore from the gangue;
   processing the mineral ore after the mineral ore has been crushed to produce a concentrate in which a concentration of the refractory ore is larger than a concentration of the refractory ore in the mineral ore and a concentration reject in which a concentration of the refractory ore is smaller than a concentration of the refractory ore in the mineral ore;
   thickening and filtering the concentrate;
   adding an extraction solution to the concentrate, the extraction solution having a capability to dissolve the metal;
   micronizing the concentrate;
   after micronizing the concentrate, mixing the concentrate with the concentration reject; and
   after the extraction solution has dissolved at least in part the metal, filtering the concentrate mixed with the concentration reject to recover the extraction solution.

The concentration reject traps the micronized concentrate for allowing the recovery of the extraction solution by filtering of the concentrate blended with the concentration reject.

In another broad aspect, the invention provides an apparatus for extracting a metal from a mineral ore including a refractory ore contained in a gangue, the apparatus using an extraction solution having a capability to dissolve the metal. The apparatus includes:
   a crusher for crushing the mineral ore to liberate the refractory ore from the gangue;
   a grinder for grinding the refractory ore and the gangue, the refractory ore being operatively coupled to the crusher for receiving the refractory ore and the gangue after the mineral ore has been crushed;
   a concentrator for producing a concentrate in which a concentration of the refractory ore is larger than a concentration of the refractory ore in the mineral ore and a concentration reject in which a concentration of the refractory ore is smaller than a concentration of the refractory ore in the mineral ore, the concentrator being operatively coupled to the grinder for receiving the refractory ore and the gangue after the refractory ore and the gangue have been ground;
   a thickener for thickening the concentrate, the thickener being operatively coupled to the concentrator for receiving the concentrate;
   a first filtering unit for filtering the concentrate after the concentrate has been thickened, the first filtering unit being operatively coupled to the thickener for receiving the concentrate after the concentrate has been thickened;
   a micronizer for micronizing the concentrate after the concentrate has been filtered, the micronizer being operatively coupled to the first filtering unit for receiving the concentrate after the concentrate has been filtered;

a mixer for mixing together the concentrate and the concentration reject after the concentrate has been micronized, the mixer being operatively coupled to the micronizer and to the concentrator for respectively receiving the concentrate after the concentrate has been micronized and the concentration reject;

a second filtering unit having more than one filtering stage for filtering the concentrate mixed with the concentration reject to recover the extraction solution after the extraction solution has dissolved at least in part the metal, the second filtration unit being operatively coupled to the mixer for receiving the concentrate and the concentration reject after the concentration reject and the concentrate have been mixed together;

an extraction solution source for providing the extraction solution, the extraction solution source being operatively coupled to a component to provide the extraction solution thereto, the component being selected from the first filtering unit and the micronizer.

The concentration reject traps the micronized concentrate for allowing the recovery of the extraction solution by filtering the concentrate mixed with the concentration reject.

Advantages of the present invention include that the proposed method and apparatus allow to increase the recovery rate of minerals such as gold contained in mineral ore that is considered refractory. More specifically, the proposed method and device allow improvement of the recovery rate of refractory gold-containing mineral ore typically considered refractory because the gold occurs in fine particles inside its crystal.

The proposed method and device further allow for improvement of the recovery rate without creating substantial environmentally detrimental effects.

Furthermore, the proposed method and apparatus allows for improvement of the recovery rate of gold-containing refractory mineral ores using relatively conventional components and operational steps so as to provide a method and device that will be economically feasible and relatively reliable.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

An embodiment of the present invention will now be disclosed, by way of example, in reference to the following drawings in which.

DETAILED DESCRIPTION

Figure 1:
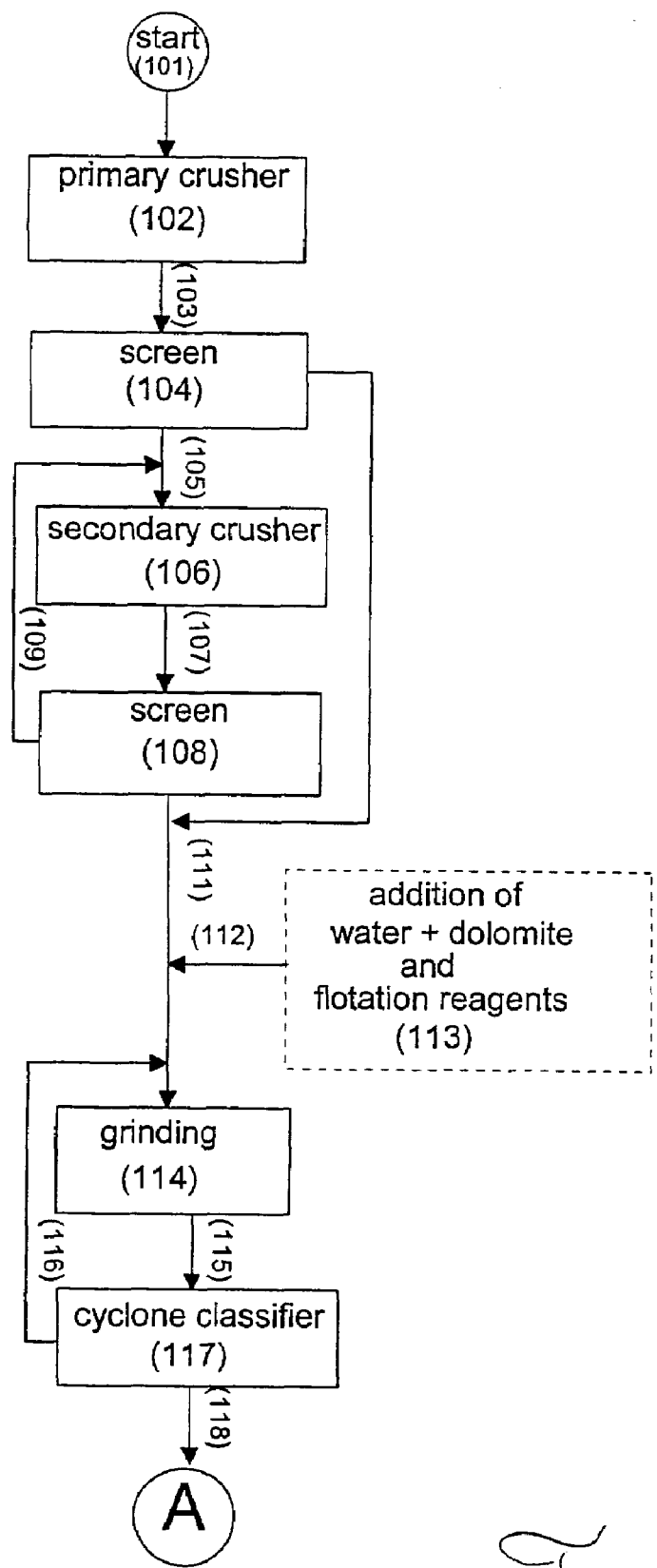
FIG. 1: is a flow chart illustrating a set of initial steps part of a method in accordance with an embodiment of the present invention using components also part of the present invention.

In general terms, the method in accordance with the present invention typically begins with crushing and grinding followed by concentration of refractory ore using gravity or flotation or, alternatively, a combination of both methods. The concentrate and concentration rejects are thickened and filtered separately.

The concentrate is then micronized, for example with a vibrating ball mill before it is mixed with the concentration reject and left in agitators for a predetermined period of time, this predetermined period of time typically being in the order of 24 to 48 hours. A cyanide and time containing extraction solution is mixed with the concentrate and the concentration reject to dissolve gold or any other suitable metal contained within the refractory ore. Once dissolved, gold or the other metal is recovered from the extraction solution after the extraction solution has been filtered out of the concentrate and concentration reject mixture. For example, the gold or the other metal is recovered using activated carbon, resin or precipitated powdered zinc.

For the purpose of this document, the term micronizing refers to a process in which a substance is reduced to particles having a size of the order of the micron. It is not required that all the particles have the same dimension. Also, some particles may be smaller than one micron and other particles may be larger than one micron. However, a micronized substance contains few or no particles larger than about 10 microns and most of the particles in weight have at least 0.1 microns in diameter.

While the proposed method is mostly illustrated with reference to the extraction of gold for which it is well-suited, the proposed method may also be used in the recovery of any other suitable metal, such as for example platinum and cobalt, among others.

The proposed method includes concentration of refractory ore followed by micronization of the concentrate until gold is liberated by the extraction solution and mixing of micronized concentrate with concentration rejects or by-products to maximize gold recovery and facilitate filtration in situations wherein powdered zinc is used for precipitation. Although the proposed method may vary depending on the mineral ore being processed, the proposed method includes the following steps:

- crush, including grinding, the mineral ore in order for refractory ore to be liberated from the gangue;
- with the crushed substance, produce a concentrate containing most of the refractory mineral ore using one of the following methods: gravimetry, flotation or a combination of both methods. Other methods may also be used without departing from the scope of the present invention, particularly if they are used for other particular mineral ores;
- thicken the concentrate; filter and reduce it to pulp containing for example between about 60% and about 80%, and in some instances about 70%, solids with a cyanide and lime treatment solution before entering the micronization circuit;
- the micronization circuit can operate either on an on-going or continuous basis using hydrocyclone batteries, or slowly, waiting for the right granular size to be obtained before emptying the grinder. The ideal granular size varies from one mineral ore to the other;
- after micronization, the concentrate is blended with the concentration in the filter repulper used for concentration rejects. Pulps density must typically exceed 50% solids before being poured into the agitators;

in some embodiments of the invention, the pulp should remain in the agitators for more than 36 hours. Ideally, the pulp is filtered once after 30 hours or so, then re-pulped to a pulp density superior to 50% solids with a cyanide solution. After it goes through the last agitator, pulp is filtered again. The cake thus obtained is mixed with fresh water and solids are fed out to a tailing site, leaving the gold particles behind in the filtered solution;

the Merrill-Crowe process is applied to the treatment solution obtained from the two filtrations to recover the gold contained in the solution. The latter can also be recovered in any other suitable manner, for example using activated carbon columns.

Figure 2:
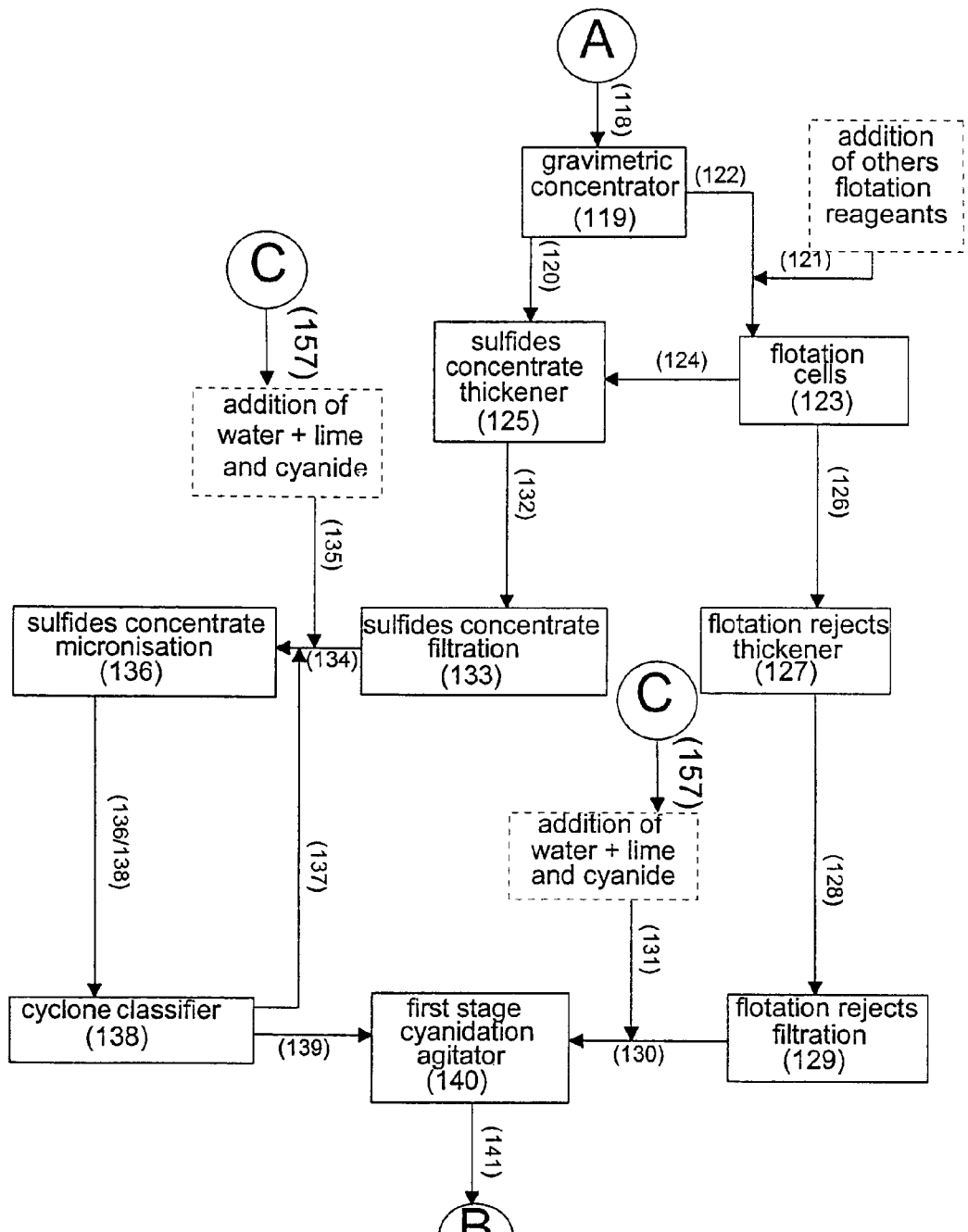
FIG. 2: is a schematic diagram illustrating intermediate steps part of the process of which the initial steps are illustrated in FIG. 1, the intermediate steps also using components part of the invention.
Figure 3:
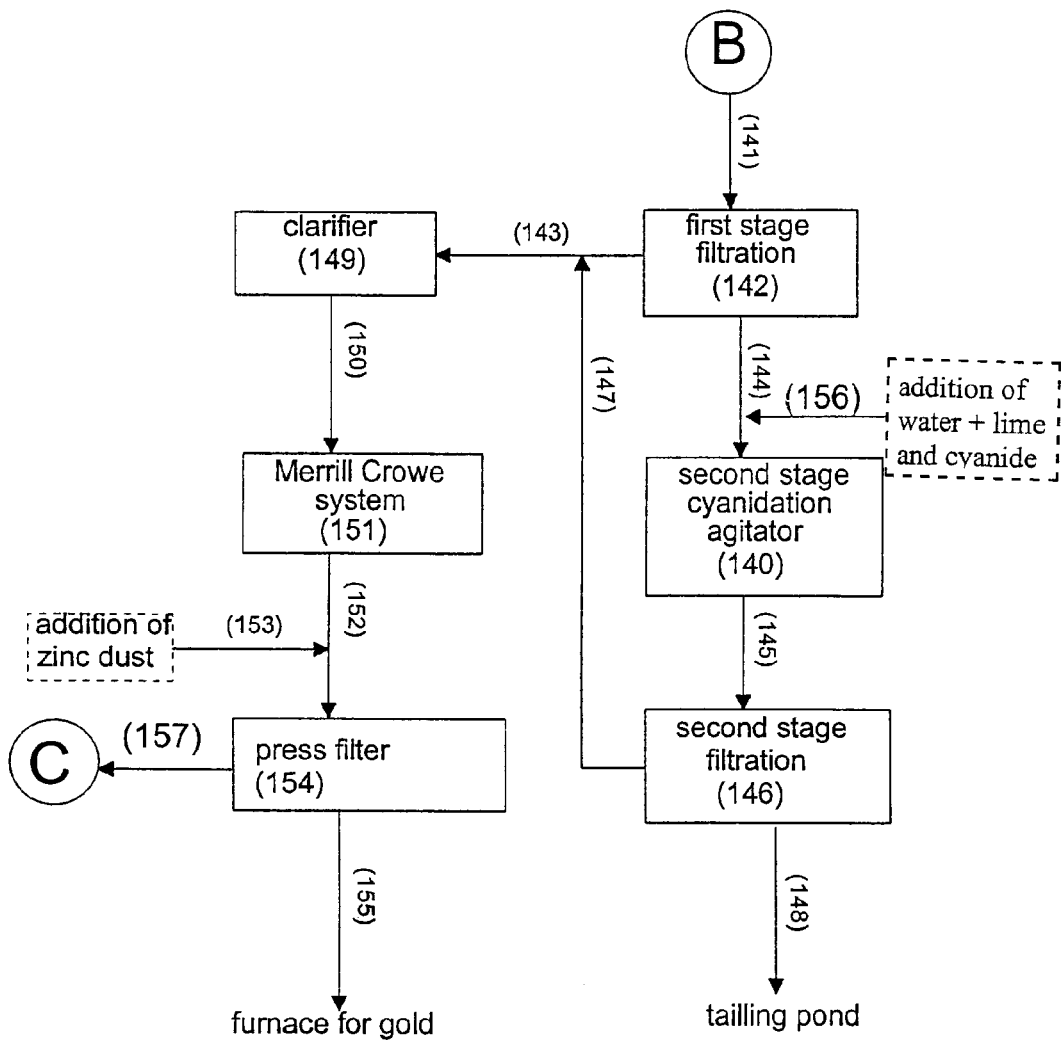
FIG. 3: is a schematic diagram illustrating end steps part of the process of which the initial intermediate steps are illustrated respectively in FIGS. 1 and 2, the end steps being performed also using components part of the invention.

Referring now more specifically to FIGS. 1 through 3, there is shown in greater details some of the steps and components associated with the present invention for a case wherein the metal is gold encapsulated within sulphites such as arsenopyrite. The mineral ore fed into the process is identified by the reference numeral 101.

The mineral is first crushed or ground until it reaches a target granular size, for example of between 1.5 and 0.6 centimeters, prior to being sent through a grinding circuit. The initial grinding is typically performed using a primary crusher 102. The primary crusher 102 is typically of the type using a breaking jaw. The outlet 103 of the primary crusher 102 is sent to the filtering screen 104.

The fraction of the material having reached the target granular size is sent as indicated by the reference numeral 111 to the grinding circuit while the larger or coarser fraction 105 is sent to a secondary crusher 106. The secondary crusher 106 is typically of the conical type.

The outlet 107 of the secondary crusher 106 is sent to the filtering screen 108. The fraction of the material having reached the target granular size is sent to the grinding circuit as indicated by reference numeral 111 while the coarser fraction indicated by the reference numeral 109 is sent back to the secondary crusher 106.

As indicated by the reference numeral 112, a mixture 113 of water and reacting agents is introduced at the inlet of the grinding circuit. The mixture 113 is intended to be used for flotation or for controlling the generation of acid. The grinding circuit 114 typically includes at least one grinder of the ball or bar type.

At the outlet 115 of the grinding circuit 114, the material is sent to a battery of cyclone classifiers 117. The cyclone classifiers 117 are adapted to sort the mineral 118 having reached the target granular size from the mineral 116 requiring further grinding in order to target granular size. The latter is sent back to the grinding circuit 114 while the mineral having reached the target granular size 118 is sent downstream towards the intermediate steps illustrated in FIG. 2.

Optionally, the material 118, having reached the target granular size, is sent to a gravimetric concentrator 119. The gravimetric concentrator 119 is adapted to recuperate coarse gold that flotation would have had difficulty recuperating. Hence, should all of the gold be finely encapsulated in sulphites, the gravimetric concentrator would be useless and could be replaced by a flotation unit that could float the sulphites at the outlet of the grinding steps. Such a concentrated product 120 would be sent in a sulphite thickener 125. The outlet 122 of the gravimetric concentrator is sent towards a flotation circuit 123 including flotation cells.

At the inlet of the flotation circuit, flotation reacting agents or re-agents 121 are added in order to favour completion of the flotation of all sulphites. The flotation step produces a concentrate 124 that is sent towards the sulphite concentrate thickener 125. The flotation circuit also produces a by-product or reject 126 which is sent to a flotation reject thickener 127.

The thickened product 128 emanating from the flotation reject thickener 127 is sent to a flotation reject filtration unit 129. The flotation reject filtration unit 129 is adapted to recuperate the water that has been used for flotation so as to allow the filtered flotation reject 130 to achieve a pulp-like state. Water with lime and cyanide forms a mixture 131 that is added to the filtered flotation reject 130. The amount of lime and cyanide within the solution 131 is adjusted and the combination of the solution and end product of the flotation reject filtration is sent to a first stage cyanidation agitator 140. The thickened product 132 leaving the sulphite concentrate thickener 125 is sent to a sulphite concentrate filtration unit 133. The sulphite concentrate filtration unit 133 is adapted to recuperate water that has been used for the flotation. The filtered product 134 is put into a pulp-like state by mixing it with a water solution 135 including water, lime and cyanide. The amount of lime and cyanide within the mixture 135 is adjusted prior to the product 134 being sent to a sulphite concentrate micronization step 136.

Micronization is performed in a closed circuit using a plurality of cyclone classifiers 138. These cyclone classifiers send the concentrated product that has not reached the desired granular size 137 back towards the sulphite concentrate micronization unit 136 while it allows the concentrated product having been sufficiently ground 139 to reach the first stage cyanidation agitator 140.

The concentrated product is micronized to allow exposure of the gold which has been encapsulated in sulphites, mainly arsenopyrite. When encapsulated in this type of mineral, gold is often in the form of a particle having a size of a micron or less. Typically, in the gold extracting industry, gold is not ground to a granular size lesser than 37 microns since it is considered problematic to recuperate gold dissolved in cyanide by filtration or by activated charcoal. In order to solve this problem, the concentrated product, once micronized, is mixed with the reject by-product of flotation prior to being cyanized. The by-product of the flotation will be used as a filtration medium for the concentrated product.

The micronized concentrated product and the reject by products are mixed together for a period of between 12 and 24 hours in the first stage cyanidation agitator 140. As illustrated more specifically in FIG. 3, the resulting pulp 141 is sent to a first stage filtration step 142. The gold-containing liquid 143 emanating from the first stage filtration step 142 is sent to a clarifier 149 in order to eliminate particles which may have passed through the filter 142. This step is considered the standard procedure when cyanizing gold using a Merrill Crowe system in order to extract gold from a solution.

Once filtered, the solid is transformed into a pulp-like state using a solution containing lime and cyanide (156) prior to being sent, as indicated by reference numeral 144, towards a second stage cyanidation agitator 140. The product remains in the second stage cyanidation agitator 140 typically for a period of between 12 and 24 hours, depending on the type of mineral being treated. The pulp 145 emanating from the second stage cyanidation agitator 140 is then sent to a second stage filtration 146. The liquid 147 emanating from the second stage filtration 146 is sent to the clarifier 149. The solid transformed in a pulp-like state by water as indicated by reference numeral 148 is sent to a tailing pond.

The Merrill Crowe system starts at the clarifier 149. Once clarified, the solution is sent, as indicated by the reference numeral 150, in the Merrill Crowe system 151 where air is removed therefrom in order to allows cementation of the gold on the zinc powder or dust 153. Zinc powder 153 is added to the solution prior to the latter being sent to a press filter 154. Once the press filter is full, the gold-containing cake formed therein is sent, as indicated by reference numeral 155, to a refinery wherein the gold will be transformed in a furnace in a gold brick. While the remaining solution (157) is sent back to a tank containing lime and cyanide solution for re-usage.

Hence, the proposed invention includes a process by which gold contained in refractory mineral ores is recovered by concentration of refractory ore, using a gravimetric method, a flotation method or a combination of gravimetric and flotation methods. The method also involves using concentrate micronization to recover gold exposed to a cyanide lixiviation solution. Gold liberation and/or exposure enables cyanide to dissolve gold. Micronized refractory ore concentrates blended with concentration rejects make pulp filtration possible and maximize gold recovery.

Refractory ore concentration minimizes the quantity of substance to be micronized. In the case of concentrates originating from another mine, it is sometimes necessary to mix the micronized concentrate with sand or a cyanidation reject or with another ground material in order to facilitate the filtration process by which the solution is recovered. When such a filtration process is used, it is considered necessary to use drum filters in order to recover as much gold-bearing solution as possible.

EXAMPLE

Figure 4:
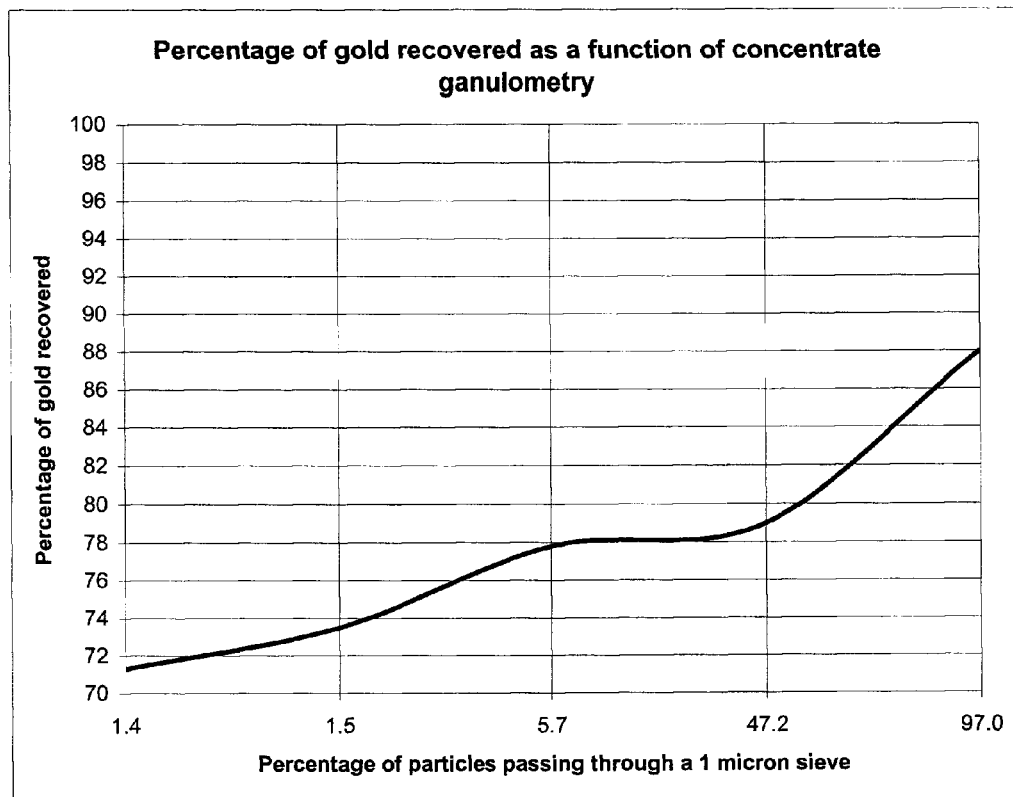
FIG. 4: is an X-Y graph illustrating the percentage of gold recovered during test runs of the method according to the invention as a function of the granulometry achieved during a micronization step of the method.

A mineral ore containing refractory gold was processed in accordance with the invention and the percentage of recovered gold was evaluated as a function of the granulometry achieved during the micronization of the concentrate. The results of these experiments are presented in FIG. 4. As seen from this Figure, gold recovery improved significantly when about at least about 40% of the particles contained in the micronized concentrate pass through a 1 micron filter. However, the proposed method produces relatively good gold recovery even for coarser granulometries.

Although the present invention has been described hereinabove by way of preferred embodiments thereof, it can be modified, without departing from the spirit and nature of the subject invention as defined in the appended claims.

What is claimed is:

1. A method for extracting a metal from a mineral ore, said mineral ore including a refractory ore contained in a gangue, said method comprising:
    crushing said mineral ore to liberate said refractory ore from said gangue;
    processing said mineral ore after said mineral ore has been crushed to produce
        a concentrate in which a concentration of said refractory ore is larger than a concentration of said refractory ore in said mineral ore; and
        a concentration reject in which a concentration of said refractory ore is smaller than a concentration of said refractory ore in said mineral ore;
    thickening and filtering said concentrate;
    adding an extraction solution to said concentrate, said extraction solution having a capability to dissolve said metal;
    micronizing said concentrate;
    after micronizing said concentrate, mixing said concentrate with said concentration reject; and
    after said extraction solution has, at least in part, dissolved said metal, filtering said concentrate mixed with said concentration reject to recover said extraction solution; whereby said concentration reject traps said micronized concentrate for allowing the recovery of said extraction solution by filtering of said concentrate mixed with said concentration reject.

2. A method as defined in claim 1, wherein said metal includes gold and said extraction solution includes cyanide and lime.

3. A method as defined in claim 2, further comprising using a Merril-Crowe process to recover said gold after filtrating said extraction solution.

4. A method as defined in claim 1, wherein processing said mineral ore to produce said concentrate includes grinding said mineral ore to produce ground ore after said mineral ore has been crushed.

5. A method as defined in claim 4, wherein processing said mineral ore to produce said concentrate includes concentrating said ground ore using one of a gravimetric concentrator, a flotation unit or both a gravimetric concentrator and a flotation unit.

6. A method as defined in claim 1, further comprising thickening and filtering said concentration reject before mixing said concentrate with said concentration reject.

7. A method as defined in claim 1, wherein micronizing said concentrate includes micronizing said concentrate in a vibrating ball mill.

8. A method as defined in claim 1, wherein said concentrate is micronized to achieve a granulometry such that at least about 40 percent of particles contained within said concentrate pass through a 1 micron sieve.

9. A method as defined in claim 1, wherein said concentrate is thickened and filtered to produce a pulp including from about 60% to about 80% of solids.

10. A method as defined in claim 9, wherein said concentrate is thickened and filtered to produce a pulp including about 70% of solids.

11. A method as defined in claim 1, wherein said concentration reject and said concentrate are mixed together for a duration of from about 12 hours to about 24 hours.

12. A method as defined in claim 1, further comprising adding fresh treatment solution to solids remaining after said extraction solution has been recovered to obtain a pulp and mixing said pulp for a predetermined amount of time.

13. A method as defined in claim 12, wherein said predetermined amount of time is from about 12 hours to about 24 hours.

14. An apparatus for extracting a metal from a mineral ore including a refractory ore contained in a gangue, said apparatus using an extraction solution having a capability to dissolve the metal, said apparatus comprising:
    a crusher for crushing said mineral ore to liberate said refractory ore from said gangue;
    a grinder for grinding said refractory ore and said gangue, said grinder being operatively coupled to said crusher for receiving said refractory ore and said gangue after said mineral ore has been crushed;
    a concentrator for producing a concentrate in which a concentration of said refractory ore is larger than a concentration of said refractory ore in said mineral ore and a concentration reject in which a concentration of said refractory ore is smaller than a concentration of said refractory ore in said mineral ore, said concentrator being operatively coupled to said grinder for receiving said refractory ore and said gangue after said refractory ore and said gangue have been ground;
    a thickener for thickening said concentrate, said thickener being operatively coupled to said concentrator for receiving said concentrate;

a first filtering unit for filtering said concentrate after said concentrate has been thickened, said first filtering unit being operatively coupled to said thickener for receiving said concentrate after said concentrate has been thickened;

a micronizer for micronizing said concentrate after said concentrate has been filtered, said micronizer being operatively coupled to said first filtering unit for receiving said concentrate after said concentrate has been filtered;

a mixer for mixing said concentrate with said concentration reject after said concentrate has been micronized, said mixer being operatively coupled to said micronizer and to said concentrator for respectively receiving said concentrate after said concentrate has been micronized and said concentration reject;

a second filtering unit having more than one filtering stage for filtering said concentrate mixed with said concentration reject to recover said extraction solution after said extraction solution has dissolved at least in part said metal, said second filtration unit being operatively coupled to said mixer for receiving said concentrate and said concentration reject after said concentration reject and said concentrate have been mixed together;

an extraction solution source for providing the extraction solution, said extraction solution source being operatively coupled to a component to provide the extraction solution thereto, the component being selected from said first filtering unit and said micronizer;

whereby said concentration reject traps said micronized concentrate for allowing the recovery of said extraction solution by filtering of said concentrate mixed with said concentration reject.

* * * * *